Jan. 4, 1955   W. L. MORGAN   2,698,593
SIGNALING MIRROR
Filed Feb. 28, 1952
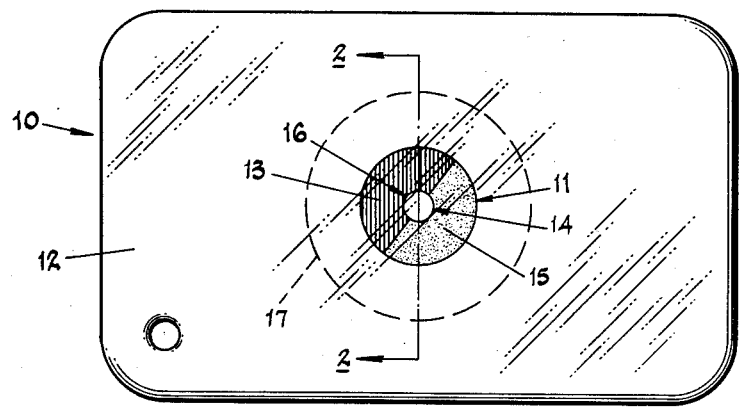
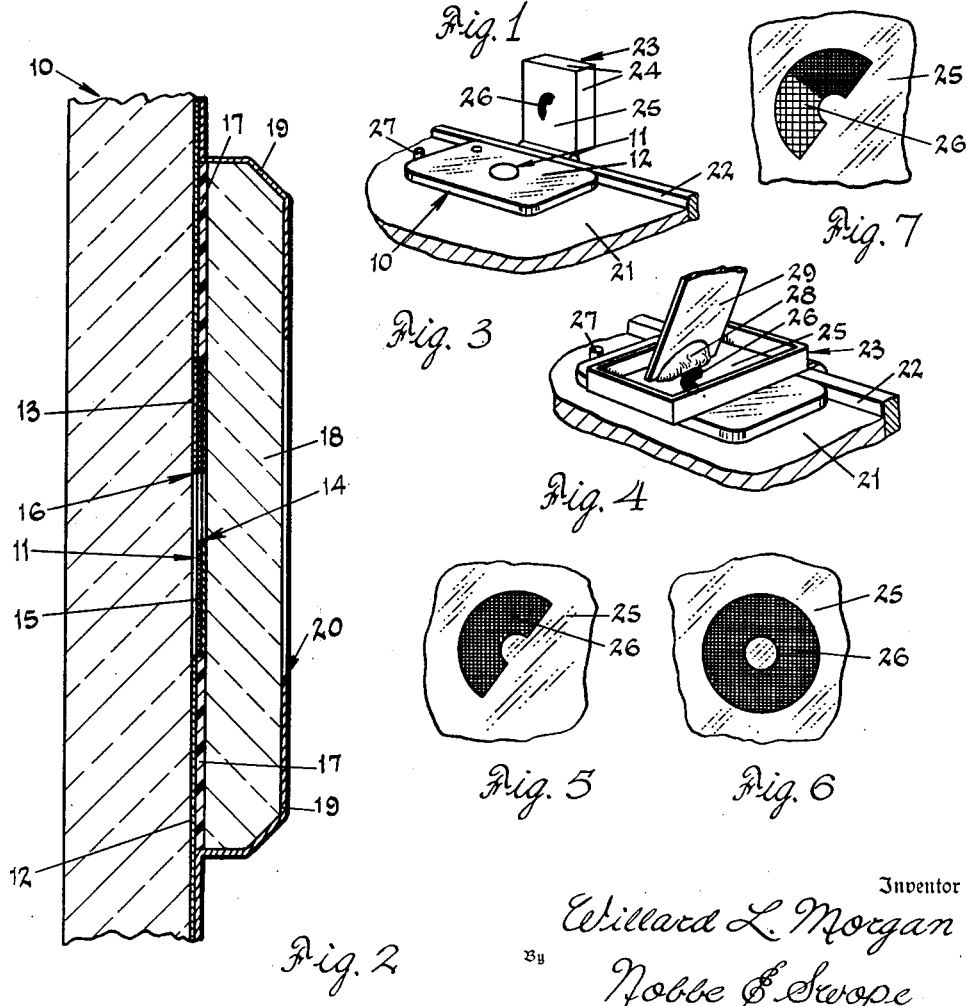
Inventor
Willard L. Morgan
By Nobbe & Swope
Attorneys United States Patent Office 2,698,593
Patented Jan. 4, 1955

2,698,593

SIGNALING MIRROR

Willard L. Morgan, Pittsburgh, Pa., assignor to Libbey-Owens-Ford Glass Company, Toledo, Ohio, a corporation of Ohio Application February 28, 1952, Serial No. 273,921

3 Claims. (Cl. 116—20)

This invention relates broadly to signaling devices for sending signals by reflecting sunlight to desired targets and particularly to an improved signaling mirror wherein a colored filter for said mirror is formed integrally therewith.

Signaling mirrors of this type have been used principally by persons in distress for attracting the attention of potential rescuers. Due to the conditions under which they are generally used, it is necessary that they be small, compact and simplified in construction. In using them, a dual operation is involved. That is, the mirror must be held in such a manner that the sun's rays fall on the reflecting surface thereof and must then be aimed or oriented in such a manner that the rays falling thereon are reflected onto the target, or potential rescuers.

Basically then, these signaling mirrors comprise a highly reflective mirror surface for reflecting the sun's rays falling thereon and thereby producing a signal, as well as means associated therewith for readily and accurately aiming said reflected rays or signal at the target. The aiming means normally comprises a retroreflective surface, positioned over and behind a clear space in said mirror surface, for retroreflecting certain of the rays falling on said retroreflective surface through a sighting hole therein, to the eye of the observer. Thus, there is presented to the observer's eye a virtual image of the sun, such that said observer is enabled to aim the signal at the desired target, in a manner well known in the signaling mirror art and to be hereinafter explained in more detail. Also, a colored, partially transparent filter element is frequently used in this type of signaling mirror and is placed between the clear space in the mirror and the retroreflective surface so as to overlie and entirely cover said retroreflective surface and thereby reduce the brilliance of the sun's rays as they are retroreflected to the eye of the observer.

Of course, the above description is but a general one and is not intended to cover all known varieties of this type of signaling mirror. Nor is it meant to be illustrative of the novelty of this invention, but merely to present a background by which the improvements contained in the invention can be more readily appreciated.

Varying sky conditions and consequent variance in the brilliance of the sun's rays will, of course, lessen the advantages of a filter of only one color intensity. That is, while practical for cloudless and extremely bright days, a colored filter of deep intensity would be less practical for cloudy, dull days. Therefore, it has been found highly advantageous to use a filter composed of adjacent areas of different color intensities which can be used in a manner such that the area of color intensity best suited for prevailing sky conditions can be selected by the operator as the signal is aimed at the target.

Heretofore, the colored filter when used with signaling mirrors as above-mentioned has taken the form of a separable disc-like element, positioned behind and within the bounds of a windowed or clear portion through an opaque coating on the flat, highly reflective mirror surface and in front of and over the retroreflective surface. Not only does this require the fabrication or purchase of another and separable part in the manufacture of the several parts making up the signaling mirror, but also it makes necessary, in the assembly of the separate filter element with said other parts, very precise and detailed measurements. That is, the separate filter element has to be carefully placed upon and within the bounds of the clear space or window of the mirror and held thereon during assembly of the various parts. This, of course, involves a good deal of time as well as the possibility of error in the aligning process.

Furthermore, the ordinary type of separable filters available for purchase in large quantities are of a solid or non-varying color intensity. It can be readily understood that to fabricate separable filters of varying color intensity would be both difficult and expensive.

This invention, therefore, contemplates the provision of a colored filter coated upon and integral with the mirror so as to eliminate the necessity of a separable filter element as well as the added assembly procedure incident therewith. More particularly, in this invention the filter is painted or stenciled directly onto the window portion of the mirror surface, to form a coating which is integral with said mirror as a composite part thereof, in a manner which is both simple and efficient.

Furthermore, by means of the novel apparatus herein provided for stenciling the filter onto the mirror surface in accordance with this invention, a filter composed of areas of varying color intensity may be produced without added effort or expense.

It is, therefore, an object of this invention to provide an improved signaling mirror wherein the necessity of the fabrication and assembly of a separable filter element is eliminated.

Another object of this invention is to provide an improved filter element for use with signaling mirrors whereby the operator is enabled to compensate for varying sky conditions.

Other objects and advantages of this invention will become more apparent during the course of the following description when taken in connection with the accompanying drawings.

In the drawings, wherein like numerals are employed to designate like parts throughout the same:

Fig. 1 is a plan view of a signaling mirror embodying this invention;

Fig. 2 is an enlarged fragmentary sectional view taken substantially on line 2—2 of Fig. 1;

Fig. 3 is a perspective view of the stenciling apparatus in non-stenciling position;

Fig. 4 is an enlarged perspective view of the stenciling apparatus of Fig. 3 in stenciling position; and Figs. 5 to 7 are plan views of alternative forms of stencils.

Referring now to the drawings and particularly to Figs. 1 and 2, wherein is illustrated a preferred embodiment of this invention, there is provided a mirror 10, which may be made of polished plate glass, tempered glass, or other suitable transparent, refractive material. The back surface of said mirror, with the exception of the opening or window 11, is covered with a metallic mirror coating 12 preferably of silver, aluminum, or chromium. Upon the window 11 is coated, by painting or stenciling, a colored, partially transparent filter element 13 in a manner to be hereinafter described. The filter element is shown in the preferred embodiment of Figs. 1 and 2 as being split or semi ring-shaped covering only a portion of window 11, for a purpose to be described, but it may take the shape of a whole ring or any part or parts thereof without departing from the scope of this invention. Also, the filter is shown in these figures as being of a uniform color intensity, although it is to be understood that it may be made of adjacent areas of different or varying color intensity.

In back of and covering the filter element 13 and conforming in shape to window 11 is a retroreflective surface 15, the center of which is apertured at 14 for sighting therethrough. As best shown in Fig. 1, the split ring-shaped filter element 13 is notched or cut out at 16, said notched portion corresponding to and in alignment with sighting aperture 14 as a continuation thereof.

It has been found satisfactory to use, as a retroreflective surface 15, retroreflector sheets marketed by Minnesota Mining and Manufacturing Company under the trade name "Scotchlite," although it would be within the realm of this invention to use other products with similar characteristics. In any case, however, the surface is in the form of either a disc-like paper member, into which are embedded or secured in any suitable manner individual, spherical "Scotchlite" type beads having high angularity retroreflective surfaces, or a wire mesh screen in which case the beads are supported on the strands of said screen, similarly to beads 14 on screen 12 of Patent No. 2,557,108.

Disposed rearwardly of the back surface of mirror 10 and against a portion of mirror coating 12 is a cylindrical washer 17 of a thermoplastic resin, such as polyvinyl butyral or other suitable bonding material. The opening through the washer is of a size to snugly accommodate the disc-like retroreflective surface 15. Retaining plate 18, of glass or other transparent material, is disposed rearwardly of washer 17. Mirror 10 is bonded to plastic washer 17 and said washer to retaining plate 18 in airtight relation in any suitable manner to form a composite unit.

As illustrated, the retaining plate 18 is cylindrical and conforms to washer 17 such that it projects in buttonlike fashion from the back surface of the mirror. It is to be understood, of course, that this invention contemplates other retaining plate and washer shapes such as, for example, rectangular ones which would cover and conform to the back surface of the rectangular mirror. Further, the aiming apparatus in general, comprising filter 13 and retroreflective surface 15, as well as said retaining plate, has been shown as being located centrally of the top, bottom, and side edges of the mirror. However, this apparatus might just as well be offset toward one of the four corners of the mirror or toward any one of the edges thereof.

The exposed portions of metallic mirror coating 12 and plate 18 are covered with a black paint or other suitable opaque backing material, as at 19, except for an opening 20 on said plate for sighting through aperture 14. This backing 19 serves, for example, to protect the metallic mirror coating 12 from the corrosive effects of salt water as well as to present a background upon which instructions on the use of the mirror may be applied.

A preferred method and means for applying filter 13 upon window 11 is illustrated in Figs. 3 and 4. The mirror 10 is placed upon a preferably smooth and flat-surfaced support 21 and against one side of a straight edged abutment 22, with the coated surface 12 and windowed portion 11 therethrough facing upwardly, as shown. Pivoted to the opposite side of the abutment 22 is a box-like member 23 comprising sides 24 and a silk screen 25 at the bottom portion thereof which faces mirror 10. Screen 25 is perforated as shown and the area outlined by the perforations, comprising a stencil 26, corresponds to the shape of the filter 13 to be applied onto the window 11, which in this instance is of semi or split ring design.

Carried by the support 21 is an upstanding guide pin 27 which is spaced from abutment 22 a substantial distance such that mirror 10 can be held rigidly thereagainst. Also, pin 27 is spaced longitudinally from stencil 26 of box 23 a measured distance in order that the said stencil may be accurately positioned over and within the bounds of window 11. As is obvious from the drawings, box 23 is swung from its upright position in Fig. 3 to a horizontal stenciling position upon the mirror as shown in Fig. 4. At this time, a batch of colored ink 28 is placed upon the inside surface of screen 25 and forced through the stencil 26 onto window 11 by means of a squeegee 29, which may consist of a smooth-surfaced block of soft rubber.

Figs. 5 to 7 illustrate alternative forms which stencil 26 may take, depending of course on the type and shape filter 13 desired. For example, in producing a semi or split ring type filter of unvarying color intensity, as shown in Figs. 1 and 2, the stencil of Fig. 5 would be used in which case the perforations in silk screen 25 which define the stencil are of uniform size and distribution. Alternatively, a whole ring type filter, also of unvarying color intensity, could be produced by means of the stencil shown in Fig. 6. On the other hand, a filter having adjacent areas of different color intensity and of a split ring shape could be produced with the stencil shown in Fig. 7 in which case the perforations are either of non-uniform size or distribution.

From the foregoing description, the advantages of the novel method herein provided for applying a colored filter directly to the signaling mirror are apparent. Equally apparent is the ease by which filters of adjacent areas of different color intensity may be produced.

By way of example, it has been found satisfactory to form the filter of a colored, partially transparent ink, comprising 3% of dyestuff consisting of Calco Chemical Company, American Cyanamid Company, Oil Red No. N–1700 dissolved in International Printing Ink Company printing ink clear vinyl resin base No. BL–4677. Alternatively, there may be used in this same base, 3% of dyestuff solution of General Dyestuff Corporation, Sudan Red 2BA.

As previously mentioned, in using signaling mirrors of this type a dual operation is involved. Initially, the mirror 10 is faced toward the sun and target and held by an observer in such a manner that his eye is directly behind sighting aperture 14 and shielded behind the metallic mirror coating 12 from the sun's rays which are falling on the front surface of the mirror and are being reflected from the opposite side of said mirror coating.

The mirror is then faced so that the axis of the sighting aperture, or a line perpendicular to the plane of the mirror, will lie approximately between the desired target and the sun and on a straight line therebetween. The mirror is held in this approximate position while the observer looks through the sighting aperture at the target. At the same time the observer will see a virtual image of the sun by means of certain of the sun's rays which are retroreflected from the surface 15 through sighting aperture 14, in a manner well known in the signaling mirror art. Of course, due to the colored filter 13, which may in this instance entirely cover the retroreflective surface 15, the virtual image is colored and thus less brilliant. When both the target and virtual image are seen through the sighting aperture, the observer need only orient the mirror back and forth until said image is superimposed upon the target at which time a signal is reflecting onto the target.

It has been found that during the aforementioned orientation step, as the aiming spot is being superimposed upon the target, better results are obtained with a bright image. However, when the image has been approximately superimposed, it has been found advantageous to "pinpoint" or center the spot on the target with a colored and less brilliant aiming spot through which the target can be seen in greater detail. Thus, the advantage of the partial ring type filter element, as shown in Figs. 1 and 2, over the type which entirely covers the retroreflective surface 15, can be readily understood when taken in connection with the following modified method of using the mirror.

When facing the mirror as noted previously, the observer must also see that a portion of retroflective surface 15 not covered by the partial filter element is disposed toward the target and away from the sun. In this way, the virtual image seen by the observer through the sighting aperture 14 is white and brilliant inasmuch as the rays of the sun which are retroreflected through said sighting aperture to the observer's eye do not strike the colored filter 13. This brilliant, uncolored image permits very rapid general locating of the aiming spot on the target as well as maximum visibility of the sky while so doing. When the mirror has been oriented for the purpose of approximately superimposing the virtual image on the target, the mirror is turned on the axis of the sighting aperture such that a portion of retroreflective surface 15 covered by the colored filter is disposed toward the target and away from the sun. Thus, the virtual image is changed from a brilliant, uncolored image to a less brilliant colored image and can at this time be "pinpointed" or accurately superimposed upon the target.

Also, when a filter composed of adjacent areas of different and varying color intensities and formed with the stencil shown in Fig. 7 is used, the observer is able to orient the mirror in such a way as to selectively use an area of said filter which is best adapted to prevailing sky conditions. That is, after the mirror has been turned on the axis of the sighting aperture as above noted in order to dispose a portion of retroreflective surface 15 covered by the filter toward the target, it may be further turned in order to allow the different areas of said filter to be so disposed. In this manner, the operator is enabled to experimentally determine which of said areas of color intensity is best suited for the prevailing sky conditions.

It is to be understood that the form of the invention disclosed herein is to be taken as the preferred embodiment thereof, and that various changes in the shape, size and arrangement of parts may be resorted to without departing from the spirit of the invention or the scope of the following claims.

I claim:
1. A mirror signaling device for reflecting sunlight to a desired target, comprising a transparent support, an opaque mirror coating upon the rear surface of said support and provided with an open space therein, a colored filter coating within said open space adhered directly to said support and having optical contact therewith, said filter being in the same plane as said mirror coating and in line with said coating, a retroflective element of reduced light transmission in back of the colored filter coating and cooperating with a forwardly spaced surface of said support for reflecting a virtual image of the sun to the eye through said filter, and a clear, open sighting aperture through said retroreflective element and filter coating registering with said open space for superimposing the said virtual image upon said target to aim a reflected light signal from said mirror coating upon said target.

2. A mirror signaling device as in claim 1 in which the colored filter coating covers only a portion of said retroreflective element.

3. A mirror signaling device as in claim 1, in which the colored filter coating comprises adjacent areas of different color intensity and light transmission.

References Cited in the file of this patent

UNITED STATES PATENTS

| | | |
|---|---|---|
| 1,676,760 | Wilson | July 10, 1928 |
| 1,698,307 | La Hodny | Jan. 8, 1929 |
| 2,354,018 | Heltzer | July 18, 1944 |
| 2,412,616 | Hunter | Dec. 17, 1946 |
| 2,557,108 | Hunter | June 19, 1951 |
| 2,560,724 | Harrison | July 17, 1951 |